United States Patent [19]

Henlin

[11] Patent Number: 4,709,346
[45] Date of Patent: Nov. 24, 1987

[54] CMOS SUBTRACTOR

[75] Inventor: Dennis A. Henlin, Dracut, Mass.

[73] Assignee: Raytheon Company, Lexington, Mass.

[21] Appl. No.: 718,412

[22] Filed: Apr. 1, 1985

[51] Int. Cl.[4] .......................... G06F 7/42; G06F 7/50; H03K 19/21; H03K 19/20

[52] U.S. Cl. ..................................... 364/784; 307/471

[58] Field of Search ............... 364/768, 784, 785, 786; 307/471, 472

[56] References Cited

U.S. PATENT DOCUMENTS

| | | | |
|---|---|---|---|
| 3,084,861 | 4/1963 | Roberts | 364/786 |
| 3,257,551 | 6/1966 | Götz et al. | 364/786 |
| 3,766,371 | 10/1973 | Suzuki | 364/784 |
| 3,816,734 | 6/1974 | Brendzel | 364/786 |
| 3,878,986 | 4/1975 | Hirasawa | 364/784 |
| 4,471,454 | 9/1984 | Dearden et al. | 364/784 |
| 4,547,863 | 10/1985 | Colardelle | 364/784 |
| 4,564,921 | 1/1986 | Suganuma | 364/784 |
| 4,592,007 | 5/1986 | Ohhashi | 364/784 |
| 4,601,007 | 7/1986 | Uya et al. | 364/784 |
| 4,621,338 | 11/1986 | Uhlenhoff | 364/784 |

OTHER PUBLICATIONS

*Toshiba Review*, pp. 27–28, Jan.–Feb. 1970.
Floyd, "*Digital Logic Fundamentals,* pp. 173–185, 1977, Charles E. Merrill Publishing Co., Columbus Oh.

*Primary Examiner*—Gary V. Harkcom
*Assistant Examiner*—Dale M. Shaw
*Attorney, Agent, or Firm*—Philip J. McFarland

[57] ABSTRACT

A subtractor for an N-bit digital number comprising N cascaded cells, each cell being adapted to effect subtraction by two's complement arithmetic and to provide a carry-out signal in accordance with the level of two bits being processed and a carry-in signal.

1 Claim, 2 Drawing Figures

CMOS SUBTRACTOR

BACKGROUND OF THE INVENTION

This invention pertains generally to CMOS very large scale integrated (VLSI) circuits formed on semiconductor chips and particularly to a CMOS binary difference cell.

The most common method of performing a subtraction of two binary numbers (A−B) is to invert the subtrahend (B) and add it to the minuend (A) in a binary adder, the carry-in input being set to a logic level one. When the binary numbers being processed are N-bit numbers (where "N" is an integer greater than one), N+1 inverter and binary adder stages are required. Each inverter stage occupies space on the semiconductor chip, consumes power and slows operation. Furthermore, the complexity of the design of each binary adder stage is increased to be sure that the carry-in input is at a logic level one when subtraction is being carried out. Finally, it will be appreciated that the N+1 binary adder stage is required for subtraction utilizing two's complement arithmetic on two N-bit numbers to allow sign information of the difference to be provided.

SUMMARY OF THE INVENTION

With the foregoing background of the invention in mind, it is a primary object of this invention to provide a CMOS binary difference cell wherein an extra stage is not required to take care of a sign bit.

It is another object of this invention to provide a CMOS binary difference cell wherein the speed of subtraction of two binary numbers is increased.

The foregoing and other objects of this invention are generally attained by providing an N-stage subtractor, each stage being a CMOS binary cell that produces an output in two's complement form which represents the difference (A−B) where A is the minuend and B is the subtrahend of corresponding bits in two binary numbers being processed. Each binary cell operates on three inputs $A_i$, $B_i$ and $X_i$ (where $A_i$ and $B_i$ are two binary digits and $X_i$ is a borrow input signal) to provide a difference output, $D_i$, and a borrow output, $X_{i+1}$, that, when N cells are combined, form an N-bit subtractor.

BRIEF DESCRIPTION OF THE DRAWINGS

For a more complete understanding of this invention, reference is now made to the following description of the accompanying drawings, wherein.

DESCRIPTION OF THE PREFERRED EMBODIMENT

Figure 1:
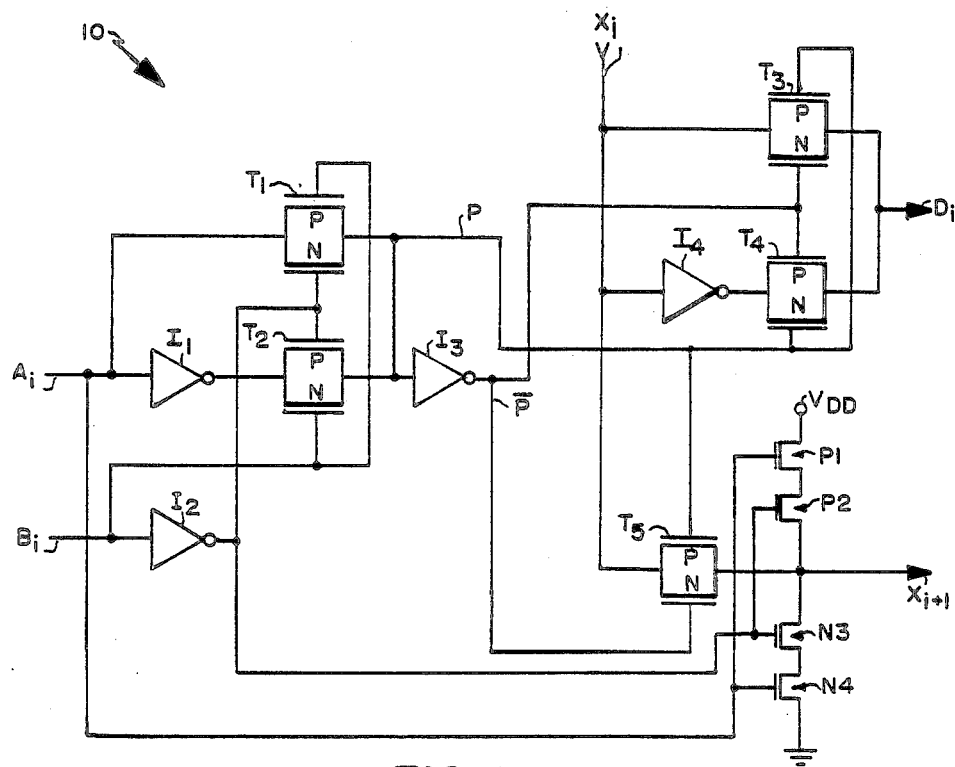
FIG. 1 is a schematic diagram of a CMOS binary difference cell according to this invention.

Referring now to FIG. 1, a CMOS binary difference cell 10 according to this invention is shown to receive $A_i$, $B_i$ and $X_i$ input signals and to provide a difference, $D_i$, and a borrow-out, $X_{i+1}$, output signals. The truth table for the binary difference cell 10 is presented in TABLE 1.

TABLE 1

| $A_i$ | $B_i$ | $X_i$ | $D_i$ | $X_{i+1}$ |
|---|---|---|---|---|
| 0 | 0 | 0 | 0 | 0 |

TABLE 1-continued

| $A_i$ | $B_i$ | $X_i$ | $D_i$ | $X_{i+1}$ |
|---|---|---|---|---|
| 0 | 0 | 1 | 1 | 1 |
| 0 | 1 | 0 | 1 | 1 |
| 0 | 1 | 1 | 0 | 1 |
| 1 | 0 | 0 | 1 | 0 |
| 1 | 0 | 1 | 0 | 0 |
| 1 | 1 | 0 | 0 | 0 |
| 1 | 1 | 1 | 1 | 1 |

From an inspection of the truth table of Table 1, it will be apparent to one of skill in the art that the difference output, $D_i$, of the binary difference cell 10 can be described by the following Boolean equation:

$$D_i = A_i \oplus B_i \oplus X_i \quad (1)$$

The borrow-out output, $X_{i+1}$, of the binary difference cell 10 may be defined as follows:

$$X_{i+1} = (\overline{A_i \oplus B_i}) X_i + \overline{A}_i B_i \quad (2)$$

It should now be appreciated by those of skill in the art that if the borrow-in input, $X_i$, of Equation (1) were replaced with a carry-in input, $C_i$, then Equation (1) would provide the sum of $A_i$, $B_i$ and $C_i$. The borrow-out term, $X_{i+1}$, defined by Equation (2) is, however, substantially different from the equation defining the carry-out output, $C_{OUT}$, of a full adder. In a co-pending application (Ser. No. 648,930 filed Sept. 10, 1984 and assigned to the same assignee as the present invention) a high speed CMOS full adder was described and claimed, and in that application the carry-out output, $C_{OUT}$, of the full adder was defined as follows:

$$C_{OUT} = (A_i \oplus B_i) C_i + A_i B_i \quad (3)$$

It follows, therefore, that the implementation of the borrow-out output defined by the Equation (2) is essentially different from the implementation of the carry-out output defined by Equation (3).

Before proceeding with a detailed explanation of the operation of the CMOS binary difference cell 10, it should be noted that the device is partially fabricated from transmission gates that represent a manner of connecting MOS transistors that is unique to CMOS logic. In general, the transmission gate is effective to pass the signal on its input terminal to the output terminal when the n-channel terminal is at a logic level 1 and the p-channel terminal is at a logic level 0. Conversely, when the n-channel terminal is at a logic level 0 and the p-channel terminal is at a logic level 1, the transmission gate is in its OFF condition and there is no transmission through the device.

Inverters $I_1$ and $I_2$ together with transmission gates $T_1$ and $T_2$ are effective to form an exclusive-OR gate that provides an $A_i \oplus B_i$ output that is hereinafter referred to as the P signal. Inverter $I_3$ then provides the exclusive-NOR output $\overline{A_i \oplus B_i}$, referred to hereinafter as the $\overline{P}$ signal. The P and $\overline{P}$ signals are used to control the transmission gates $T_3$, $T_4$ and $T_5$. It will be appreciated that the transmission gates $T_3$ and $T_4$ together with the inverter $I_4$ are effective to form an exclusive-OR gate that produces the difference output, $D_i$. Thus, when the P signal is a logic level 0 (indicating that the $A_i$ and $B_i$ inputs are the same, i.e., at either a logic level 0 or 1), transmission gate $T_4$ is OFF, transmission gate $T_3$ is ON and the borrow-in input, $X_i$, is the difference output, $D_i$.

Conversely, when the P signal is a logic level 1 (indicating that the $A_i$ and $B_i$ inputs are dissimilar) transmission gate $T_3$ is OFF, transmission gate $T_4$ is ON, and the borrow-in signal, after inversion in inverter $I_4$, is the difference output, $D_i$.

The borrow-out output, $X_{i+1}$, is formed by transmission gate $T_5$, the p-channel field effect transistors (FETS) P1 and P2, and the n-channel FETS N3 and N4. The p-channel FET, P1, and the n-channel FET, N4, are both gated by the $A_i$ input, while the p-channel FET, P2, and the n-channel FET, N3, are gated by the inverse $B_i$ input, $\overline{B}_i$, out of the inverter $I_2$. The p-channel FETS P1 and P2 generate the borrow output when the $A_i$ and $B_i$ inputs are, respectively, a logic level 0 and 1. Thus, when $A_i$ is a logic level 0, n-channel FET, N4, is gated OFF and p-channel FET is gated ON; and when $B_i$ is a logic level 1, the inverter $I_2$ is effective to provide a logic level 0 to the gate terminals of n-channel FET N3 and p-channel FET P2, turning those devices OFF and ON, respectively. With the p-channel FETS P1 and P2 ON and the n-channel FETS N3 and N4 OFF, a logic level 1 is provided as the borrow-out output, $X_{i+1}$. From the foregoing, it should now be appreciated that the n-channel FETS N3 and N4 are effective to kill the borrow output (i.e., provide a logic level 0 as the borrow-out output, $X_{i+1}$) when the $A_i$ and $B_i$ inputs are, respectively, a logic level 1 and 0.

Finally, when the $A_i$ and $B_i$ inputs are both either a logic level 0 or 1, neither the p-channel FETS P1 and P2 nor the n-channel FETS N3 and N4 are both simultaneously ON or OFF and, therefore, the borrow-in input, $X_i$, is provided, via the transmission gate $T_5$, as the borrow-out output, $X_{i+1}$.

From the truth table presented in Table 1 and the foregoing description of the operation of the CMOS binary difference cell 10, it will now be appreciated by those of skill in the art that if $A_i$ and $B_i$ are bits of the minuend and the subtrahend, respectively, and if $A_i=0$ and $B_{i=1}$, there will be a borrow-out, $X_{i+1}$ to the bits of next higher numerical significance. In subtracting multi-bit numbers, therefore, one must take account of the borrow-out, $X_i$, from the immediately previous stage.

Figure 2:
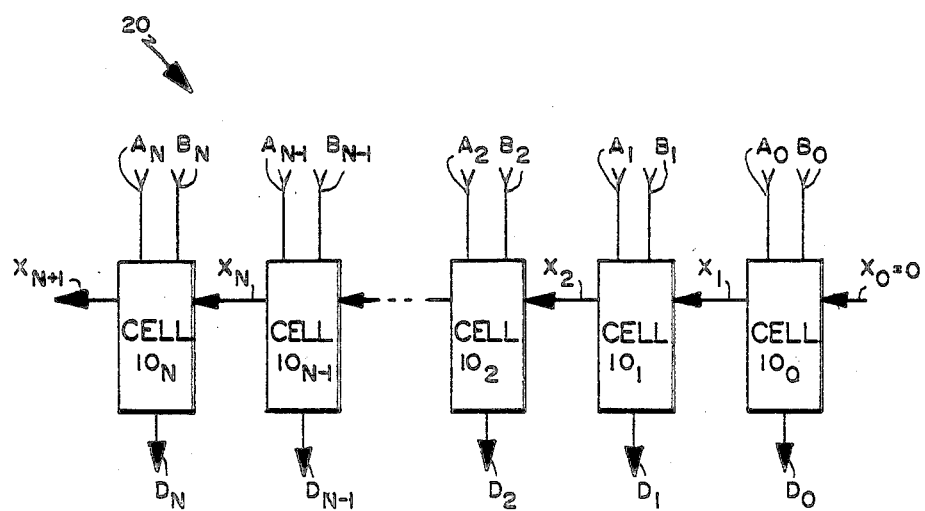
FIG. 2 is a sketch illustrating how N binary difference cells of FIG. 1 may be combined to form an N-bit subtractor.

Referring now to FIG. 2, the CMOS binary difference cell 10 can be cascaded (repeated) N times, as shown, to form an N-bit subtractor 20. It should be noted that the N-bit subtractor 20 is effective to perform the subtraction of two N-bit numbers with a total of N stages (cells) as opposed to two's complement arithmetic wherein N+1 stages are required, the extra stage providing for the sign bit. Here the sign bit information is provided by the borrow-out output of the $N^{th}$ stage. In order to illustrate the operation of the N-bit adder 20, consider the case where the minuend, A, is seven, the subtrahend, B, is five and the least significant borrow-in, $X_0$, is set to zero. The minuend, A, as a four-bit word is (0111) and the subtrahend, B, as a four-bit word is (0101). From Table 1, it follows that D=(0010) and $X_{N+1}=0$, meaning that the difference is two and that there is no borrow-out output. If, on the other hand, the minuend, A, were 5(0101) and the subtrahend, B, were 7(0111) and the least significant borrow-in, $X_0$, were set to zero, then from Table 1, the difference D=1110 and the borrow-out output $X_{N+1}=1$, which may be interpreted as indicating that the difference is negative. If this is the case, it will be recognized that the difference, D=1110, is indeed the two's complement form of −2.

Having described a preferred embodiment of this invention, it will now be apparent to those of skill in the art that many changes may be made without departing from the inventive concepts described. It is felt, therefore, that this invention should not be limited to the disclosed embodiment, but rather by the spirit and scope of the appended claims.

What is claimed is:

1. In a digital computer wherein the difference between two N-bit binary numbers is to be calculated, N stages of cascaded binary adders to effect subtraction by utilizing two's complement arithmetic, starting from the least significant bits in the two N-bit binary numbers, each one of the N stages being fabricated in CMOS circuitry to accept corresponding bits $A_i$, $B_i$, and a borrow-in signal, $X_i$, and to produce a difference signal, $D_i$, and a carry-out signal, $X_{i+1}$, each one of the N stages comprising:

(a) a first and a second inverter, responsive respectivey to the $A_i$ and $B_i$ bits to product $\overline{A}_i$ and $\overline{B}_i$ signals;

(b) a first transmission gate conditioned to pass the $A_i$ bit when the $B_i$ bit is at a logic zero level and the $\overline{B}_i$ signal is at a logic one level;

(c) a second transmission gate conditioned to pass the $\overline{A}_i$ signal when the $B_i$ bit is at a logic one level and the $\overline{B}_i$ signal is at a logic zero level;

(d) OR gate means, responsive to the outputs of the first and the second transmission gates, for producing a signal P corresponding to the one of the first and second transmission gates conditioned to pass a signal;

(e) a third inverter, responsibe to the signal P, for producing a signal $\overline{P}$;

(f) a fourth inverter, responsibe to the borrow-in bit $X_i$, for producing a signal $\overline{X}_i$;

(g) third and fourth transmission gates, conditioned by the signal P and to the signal $\overline{P}$ to pass either the borrow-in bit $X_i$ or the signal $\overline{X}_i$; and (h) borrow-out generating means, responsive to the carry-in signal, $X_i$, the P signal, the $\overline{P}$ signal, the bit $A_i$ and the output $\overline{B}_i$ of the second inverter, to produce a borrow-out signal described by the Boolean expression, $[(\overline{A}_i+\overline{B}_i)X_i+\overline{A}_iB_i]$, the borrow-out generating means consisting of:

(i) a pair of p-channel FETS and a pair of n-channel FETS connected serially between a voltage source and ground and controlled by the bit $A_i$ and the output $\overline{B}_i$ of the second inverter to produce the carry-out signal $X_{i+1}$ when the logic level of the bits $A_i$, $B_i$ differ, the pair of p-channel FETS being conductive when $A_i=0$ and $B_i=1$ to produce $X_{i+1}=1$ and the pair of n-channel FETS being conductive when $A_i=1$ and $B_i=0$ to produce $X_{i+1}=0$; and (ii) a fifth transmission gate, conditioned by the P and $\overline{P}$ signals to produce $X_{i+1}=X_i$ when $A_i=B_i$.

* * * * *